(12) United States Patent
Do et al.

(10) Patent No.: US 8,458,791 B2
(45) Date of Patent: Jun. 4, 2013

(54) HARDWARE-IMPLEMENTED HYPERVISOR FOR ROOT-OF-TRUST MONITORING AND CONTROL OF COMPUTER SYSTEM

(75) Inventors: Tam T Do, San Antonio, TX (US); Michael D LeMay, Champaign, IL (US); Galen A Rasche, San Antonio, TX (US); Ben A Abbott, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 324 days.

(21) Appl. No.: 12/858,581

(22) Filed: Aug. 18, 2010

(65) Prior Publication Data

US 2012/0047576 A1  Feb. 23, 2012

(51) Int. Cl.
*G06F 21/00* (2006.01)

(52) U.S. Cl.
USPC ............. 726/22; 713/189; 713/190; 713/191; 713/192; 713/193; 713/194

(58) Field of Classification Search
USPC .......................................................... 726/22
See application file for complete search history.

(56) References Cited

U.S. PATENT DOCUMENTS

| | | | |
|---|---|---|---|
| 2006/0136720 A1* | 6/2006 | Armstrong et al. | 713/164 |
| 2007/0271612 A1* | 11/2007 | Fang et al. | 726/22 |
| 2008/0016313 A1* | 1/2008 | Murotake et al. | 711/173 |
| 2010/0122250 A1* | 5/2010 | Challener et al. | 718/1 |

* cited by examiner

*Primary Examiner* — Ghazal Shehni
(74) *Attorney, Agent, or Firm* — Chowdhury & Georgakis PC; Ann C. Livingston

(57) ABSTRACT

A system and method for modifying a processor system with hypervisor hardware to provide protection against malware. The processor system is assumed to be of a type having at least a CPU and a high-speed bus for providing data links between the CPU, other bus masters, and peripherals (including a debug interface unit). The hypervisor hardware elements are (1) a co-processor programmed to perform one or more security tasks; (2) a communications interface between the co-processor and the debug interface unit; (3) a behavioral interface on the high-speed bus, configured to monitor control signals from the CPU, and (4) an access controller on the high-speed bus, configured to store access control data, to intercept requests on the high-speed bus, to evaluate the requests against the access control data, and to grant or deny the requests.

15 Claims, 3 Drawing Sheets

|  | SLAVE 0 | SLAVE 1 | ○ ○ ○ | SLAVE 15 |
|---|---|---|---|---|
| MASTER 0 | RW | R | ○ ○ ○ | W |
| ○ ○ ○ | ○ ○ ○ | ○ ○ ○ | ○ ○ ○ |  |
| MASTER 15 | W | W | ○ ○ ○ | RW |

HARDWARE-IMPLEMENTED HYPERVISOR FOR ROOT-OF-TRUST MONITORING AND CONTROL OF COMPUTER SYSTEM

TECHNICAL FIELD OF THE INVENTION

This invention relates to computer security, and more particularly to hardware modifications to a host computer system to provide root-of-trust monitoring and control.

BACKGROUND OF THE INVENTION

The complexity and stealthy nature of today's malware attacks make the task of securing computer systems a daunting one. The increased availability of malware techniques on the Internet has rapidly increased the frequency, number, and intricacy of attacks. Additionally, computer platforms and their applications continue to grow in complexity. While this complexity provides increased capabilities for users, it inherently leads to security vulnerabilities.

One approach to computer security is the use of hardware-based solutions that assign security functions to dedicated hardware. Because the functions on hardware are typically not directly accessible, it is difficult to change the hardware's security characteristics. Additionally, hardware-based security can reduce the overall performance penalty of monitoring while allowing real-time monitoring.

There are two approaches to hardware-based security: passive and active. Passive hardware can be useful for concealing secrets while performing security functions, but must be queried by the main system to be functional. Active hardware attempts to independently track the state of the system, and to report and correct abnormal behavior.

At a high level, active hardware monitors can be referred to as coprocessor intrusion detection systems (IDSs), and can be categorized as either loosely-coupled coprocessor IDSs or tightly-coupled coprocessor IDSs. Loosely-coupled IDSs do not reside at the same logical level as the host (monitored) processor, limiting the intrusiveness of the system as well as the data that it can access (e.g. cache, internal data buses, etc.). Tightly-coupled IDSs attempt to address the shortcomings of loosely-coupled IDSs by residing at the same or higher logical level as the host processor, allowing them equal or greater privileges than the host processor.

IDSs typically record information related to observed events, notify security administrators of important observed events, and produce reports. Many IDSs can also respond to a detected threat by attempting to prevent it from succeeding. They use several response techniques, which may involve the IDS stopping the attack itself, changing the security environment (e.g., reconfiguring a firewall), or changing the attack's content.

Another approach to computer security is the use of virtual machines (VMs) and virtual machine monitors (VMMs). VM technology allows an entire operating system (OS) to be "sandboxed", limiting the effects that a compromised OS can have on the entire system. A VMM has control over the OS, providing numerous opportunities for system monitoring and malware prevention. VMMs have been developed that run on popular commodity OSs. They create a layer of software below the OS and tightly control the interfaces between the OS and VMM, reducing the ability of an attacker to subvert an entire system.

One of the flaws typically present in a host-based IDS is that advanced malware can subvert the IDS, rendering it ineffective. Moving the IDS to a VMM enables the detection of malware that would otherwise remain hidden. However, the complexity of the VMM and the fact that it is implemented in software still leave the possibility of subverting the system.

DETAILED DESCRIPTION OF THE INVENTION

The following description is directed to a "hardware hypervisor" that provides a host computer system with security from malware. At the hardware level, the hypervisor is isolated from the rest of the system while maintaining control of the system's resources and providing protection from tampering. It combines the secret-hiding capabilities of a passive hardware system with active tightly-coupled access control capabilities and integrity checking of software layers.

Figure 1A:
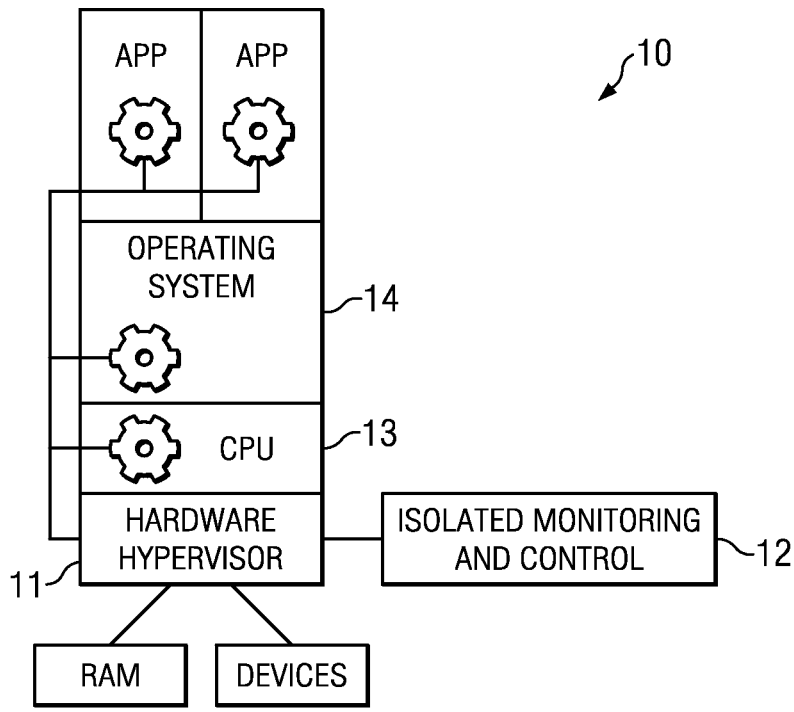
FIGS. 1A and 1B illustrate the general concepts of using a hardware hypervisor and a software hypervisor, respectively.
Figure 1B:
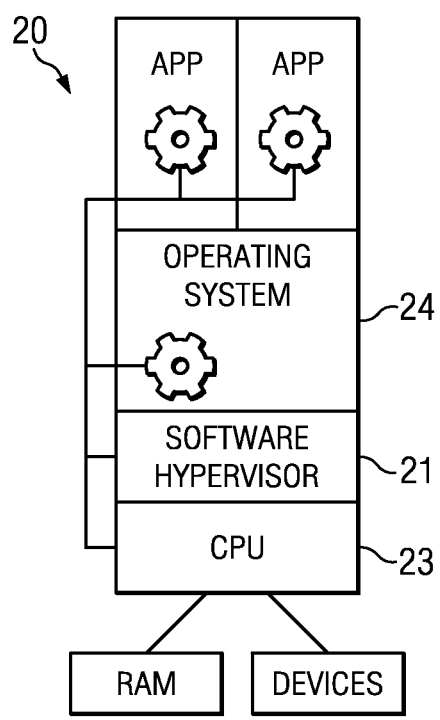

FIGS. 1A and 1B illustrate the general concepts of a hardware hypervisor 11 and a software hypervisor 21, respectively. The system being monitored, referred to herein as the "host" or "primary" system, includes conventional computer system elements, such as a central processing unit (CPU) and operating system (OS).

As indicated in FIG. 1A, the hardware hypervisor 11 resides in hardware below the CPU 13 of the primary system 10. Its monitoring and control functions, performed by a monitor processor 12, are isolated from the CPU 13 and operating system 14. The hardware hypervisor 11 provides control of access to the system's resources and protection from malware running on the primary system. In contrast, as illustrated in FIG. 1B, in a system 20 having a software hypervisor 21, the hypervisor 21 resides in software between the CPU 23 and the operating system 24.

For the hardware hypervisor 11, the monitoring and control functions are designed with the assumption that all software is untrusted until proven otherwise. This leads to a protection approach that quickly responds to anomalous system behavior, rather than relying on fixed signatures. The hardware hypervisor 11 is extensible, and its detection and response mechanisms can be configured in software to provide a more general solution as compared to approaches that handle only one class of vulnerability.

Hardware hypervisor 11 may be implemented without making any modifications to the primary system software. There is no channel for the primary system 10 to access what is stored on the hypervisor 11, providing protection from malware running on the primary system 10. This approach provides a true hardware-based root-of-trust for the computer system 10, ensuring that system integrity is maintained between system boot cycles and enforcing user-defined system policies.

Figure 2:
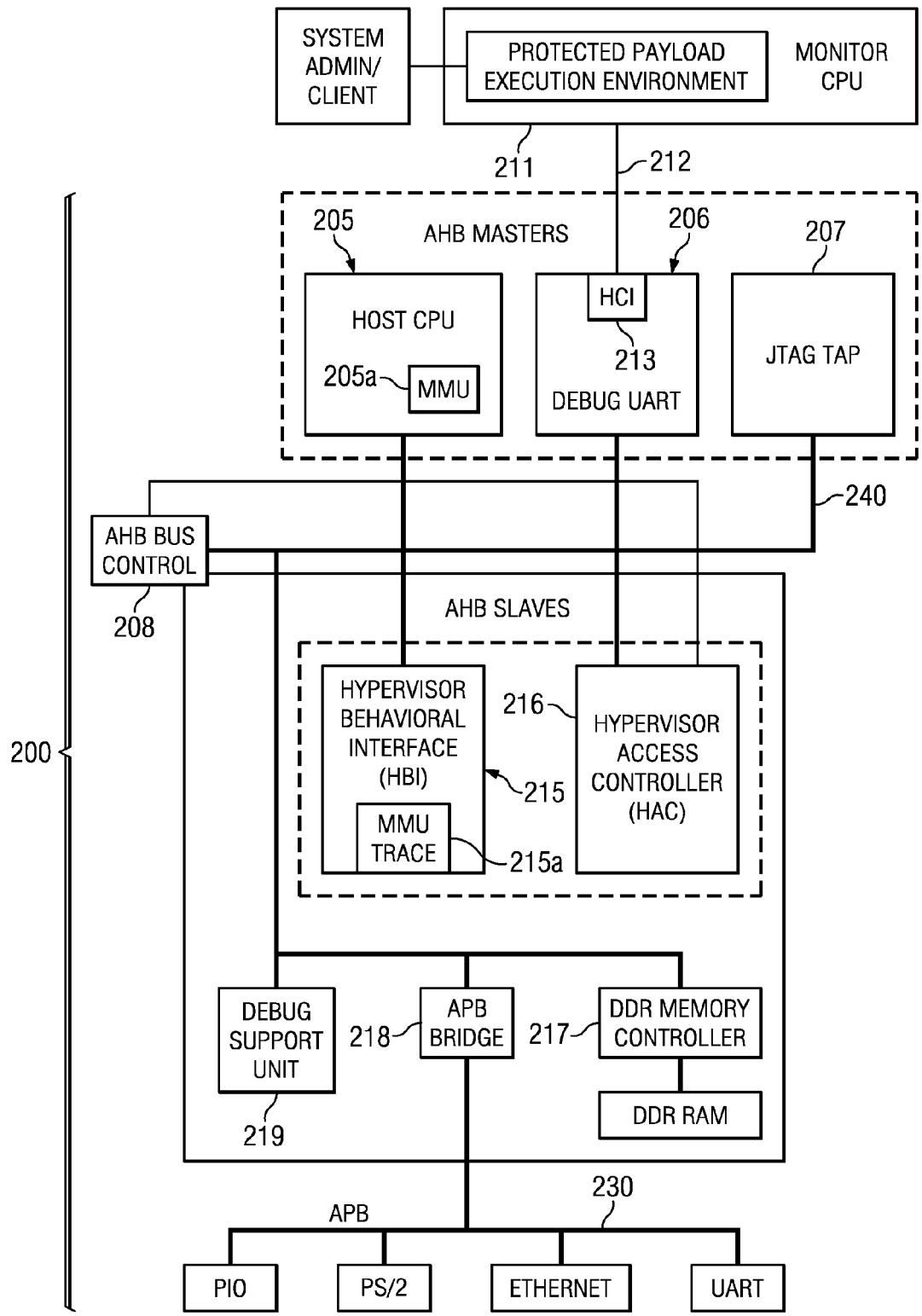
FIG. 2 illustrates a processor system, showing the hypervisor and CPU (and its peripherals) of FIG. 1A in further detail.

FIG. 2 illustrates a processor system 200, having a monitoring system (hereafter referred to as the "hypervisor") in accordance with the invention. The processor system 200 is shown with various peripherals, which except for the hardware hypervisor elements described below, are typical of today's processor chips and chip sets. FIG. 2 is intended to primarily depict the elements relevant to the present invention; other peripherals not shown may also be a part of the processor system 200.

As explained below, the hypervisor comprises an isolated monitor processor 211 and a set of hardware alterations to system 200. These hardware alterations include a hypervisor communications interface (HCI) 213, a hypervisor behavioral interface (HBI) 215, and hypervisor access controller (HAC) 216. The co-processor 211 has a narrow hardwired communication channel 212 to the host processor system 200 via the HCI 213.

In the example of this description, the monitoring system is used with a system 200 having a shared bus interconnection. This interconnection scheme is an alternative to more recently developed point-to-point interconnections. Examples of point-to-point interconnections are the Hypertransport links associated with AMD processors and the Quick Path Interconnect links associated with Intel processors. In general, the concepts described herein may be applied to systems having either point-to-point or shared bus interconnections.

For point-to-point interconnection systems, it is desirable to install monitoring and control functionality in a number of locations. At one extreme, these systems could be enhanced with distributed access control at each router to minimize overhead created by denied messages propagating over multiple links and to maximize system control. However, it may be more practical to install access control at only a few strategic nodes in the system, such as adjacent to the processor and network interface controller. For purposes of the present invention, the hypervisor is extensible, so that specific locations of monitoring and control components can vary between systems.

In the example of this description, the host processor system 200 has an Advanced Microcontroller Bus Architecture (AMBA), which is a commercially available on-chip bus for system-on-a-chip designs. The AMBA has an Advanced High-performance Bus (AHB) 240 and an Advanced Peripheral Bus (APB) 230. The AHB 240 provides communications between the CPU 205 and "master" and "slave" peripherals. The APB 230 is accessed using a bridge 218 on the AHB 240, and communicates with peripherals.

A slave interface supports programmed I/O, so that master interfaces can write/read I/O registers. A master interface can also perform DMA transactions to and from system memory without heavily loading the CPU 205.

Host system 200 has several AHB master and slave peripherals of relevance to the present invention. A Debug Universal Asynchronous Receiver-Transmitter (UART) 206 is an AHB master that provides a client with read and write access to all memory-mapped locations on the AHB bus. As explained below, for the present invention, UART 116 provides an interface 213 to the co-processor monitor 211. Like the CPU, UART 116 is a "bus master". It may be referred to generically as a "debug interface unit".

A Joint Test Action Group (JTAG) Test Access Port (TAP) 207 is an AHB master that provides access to AHB peripherals using the JTAG protocol. A Debug Support Unit 219 is an AHB slave that exports internal processor signals and records AHB transactions. It should be understood that the hypervisor could be implemented on a different processor system having equivalent components, although the nomenclature of the components may be different.

To implement communications channel 212, one hardware alteration to the host system 200 is a hypervisor communication interface (HCI) 213, which uses UART 206 to permit the monitor coprocessor 211 to indirectly access data from the host CPU 205 or its peripherals. Ideally, co-processor 211 should be able to access all peripherals that the CPU 205 can access as well as the peripherals that comprise hypervisor (HBI 215 and HAC 216). The HCI 213 is simple, and most of its complexity comes from the security components used to protect its communications to and from the monitor coprocessor 211. In a preferred embodiment, monitor coprocessor 211 may be synthesized adjacent to HCI 213, on the same silicon, obviating any need for cryptographic channel protections.

A second hardware addition to host system 200 is a slave peripheral, the hypervisor behavioral interface (HBI) 215. HBI 215 monitors internal processor control signals and transactions on system interconnects and exports that information to the monitor coprocessor 211 via the HCI 213. As explained below, the hypervisor requires access to certain processor control signals to effectively monitor and control its security-sensitive operations. However, the set of exported signals is kept small to minimize the area and wire overhead of the hypervisor elements.

A third hardware addition to host system 200 is a slave peripheral, the hypervisor access controller (HAC) 216. HAC 216 is used by co-processor 211 to selectively permit or deny system interconnect transactions in accordance with a policy specification. It may also be necessary to modify interconnect controllers to cooperatively block transactions in a graceful manner.

The two AHB slave peripherals, HBI 215 and HAC 216, support the hypervisor functionality. Both are accessible by monitor coprocessor 211 using the UART interface 206, because their configuration registers are accessible over the AHB 240.

Monitor coprocessor 211 operates independently from the host processor 205 in that it uses separate reset lines, clocks, memories, and other core system peripherals. However, it may be synthesized onto the same silicon wafer used by host processor 205, which simplifies interconnection between the two, may reduce the cost of the complete system, and increases resistance to physical attacks by rendering system interfaces physically inaccessible.

Monitor coprocessor 211 monitors and controls the operation of the host processor 205, using the hypervisor hardware modifications described above. It reports the state of the host processor 205. It is capable of performing computations in parallel with the host processor 205, but is permitted to operate more slowly than the host processor 205. This is important because many of its applications are not sufficiently sensitive from a security standpoint to justify the added expense of a second processor that is as capable as the host processor.

Security Methods; HBI

In the example of FIG. 2, HBI 215 has a Memory Management Unit (MMU) tracer 215$a$. MMU tracer 215$a$ extends the functionality of the Debug Support Unit (DSU) 219 by recording transitions in MMU control signals. In this example, host processor 205 uses a context table in conjunction with a context number to manage page table descriptors. The context table pointer and the context number are both stored in registers of MMU 205$a$. Whenever a new process is scheduled by the operating system, the context number value is modified. By monitoring changes in that register, the MMU tracer 215$a$ can monitor process transitions.

A useful system metric associated with this functionality is the amount of processor time consumed by each process (in thousands of cycles, to prevent overflow). Thus, the MMU tracer 215$a$ is configured to also record the amount of user-space processor time consumed between each transition.

It is important to exclude time spent in supervisor mode, because some kernels use process page tables even when it is running in supervisor mode. Thus, the signals that are exported from host processor 205 to the MMU tracer 215a are the MMU control signals as well as the supervisor-mode bit. Each transition is recorded in a 2-ported circular buffer so that reading from the buffer does not interfere with recording simultaneous process transitions. In this manner, the MMU tracer 215a provides reports to the co-processor 211.

Security Methods; HAC

HAC 216 selectively permits or denies individual transactions on the AHB 240. HAC 216 operates by checking each transaction between an AHB master device and an AHB slave device against two policies stored locally in registers. The first is a Device Access Control List (DACL) policy, and the second is an AHB access control region policy.

Figures 3, 4:
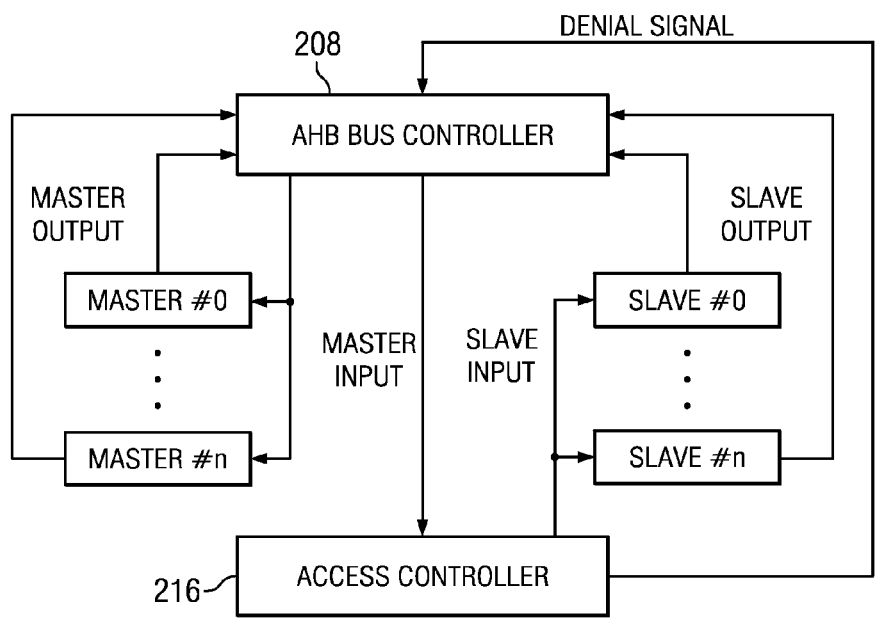
FIG. 3 illustrates a device access control list used by the hypervisor access controller (HAC) of FIG. 2.
FIG. 4 illustrates the data flow for the hypervisor access controller (HAC) of FIG. 2.

FIG. 3 illustrates how the DACL may be implemented with a matrix of master indices vs. slave indices. This matrix is possible because each AHB device, master or slave, has an index number associated with a transaction. At each location in the matrix, two bits indicate whether read and/or write access must be blocked.

The AHB access control region policy permits protection regions to be defined in terms of a base address and mask used to restrict read and/or write access by AHB transactions whose starting addresses fall within those regions (note that the actual transaction may extend beyond the regions). All policy entries are evaluated in parallel, because policy evaluation is on the critical path of the AHB 240.

FIG. 4 illustrates the data flow for AHB access control, as implemented by HAC 216. The HAC 216 intercepts each bus request and either grants or denies the request according to an access control policy. The access control policy is implemented with access control data in the form of a DACL or address regions, or both, as described above.

If the request is denied, the slave input signals are configured so that no slaves process the request, and a denial signal is sent to the AHB bus controller 208. The AHB bus controller 208 responds to the denial signal by setting the master signals to idle values.

Monitor Coprocessor Software

In the example of this description, the operating system for host processor 205 is a general-purpose LINUX version. The monitor coprocessor 211 runs Angstrom, a full-featured Linux version for embedded systems. However, in a production environment, a more efficient and minimal operating system can be used for coprocessor 211.

The monitor coprocessor 211 runs a software environment that provides interfaces to the hypervisor functionality in such a way that individual security functions can be encapsulated into payloads that are concurrently executed on the monitor coprocessor 211 while still being isolated and protected from interference by other payloads. The software environment is centered on a hardware interface library and a kernel introspection library.

The hardware interface library contains classes that can be used to access functionality from the HIB 215 and HAC 216. Ultimately, each interface uses the UART interface 206 to read and write data to and from specific memory-mapped locations on the AHB bus, but the other classes still provide significant value by abstracting away the low-level details of the AHB memory map.

The kernel introspection library provides support for interpreting the data structures in the kernel's memory. It can be easily extended, but it includes the following functionality: (1) enumerate all processes on the system, (2) look up a process by the command used to start it, (3) look up a process by its page table descriptor, (4) get the page table descriptor of a process identified by its Process Identifier (PID), and (5) translate a kernel symbol name to a virtual or physical address.

There are two primary influences on system performance resulting from the hypervisor. First, the monitor coprocessor 211 halts CPU 205 for around 581 ms while it initializes. Second, some performance degradation results from bus contention induced by requests from the kernel introspection library. However, due to the low speed of the link between the monitor coprocessor 211 and the host 205, this effect is negligible.

Example Methods

To validate the functionality of the system, a number of demonstration attacks and corresponding defenses were developed.

A first attack scenario involves a kernel-level rootkit that replaces the getdents and getdents64 system call pointers with pointers to malicious replacement functions. Those system calls are used to generate listings of directory contents, so the malicious functions are designed to remove files that match a particular number from file listings. This effectively removes any process whose PID matches the specified number from the output of the process status command.

The hypervisor can be used to detect the presence of this rootkit or any other rootkit that modifies pointers in the system call table. It accomplishes this by using debug UART 206 to periodically read the entire system call table and generate its digest using a cryptographic hash function. If at any time, the digest does not match the digest value that was computed when the payload (i.e., the software process resident on the co-processor) was first started, the payload indicates to its administrator that the system call table has been compromised. If the detection payload is started after the kernel has fully booted and before the rootkit is installed, and if its sampling period is short enough that the rootkit is still installed by the time it reads the system call table data, it can reliably detect such intrusions. A typical sampling period is 305 ms, but this could be reduced by increasing the bandwidth of communication channel 212.

A second method of using the hypervisor is using HAC 216 to prevent an intrusion process from completing in the first place. It accomplishes that by defining a write-protected region on the AHB bus such that no portion of the system call table can be written by any AHB transaction issued by the processor. Whenever such an access is attempted, the system crashes. In some applications, this is a preferable outcome to continued system operation in a compromised state, specifically when data confidentiality and integrity are valued more highly than availability.

A third method of using the hypervisor is using HAC 216 and its Discretionary Access Control List (DACL) to prevent the JTAG TAP 207 from accessing or changing data. It simply sets all bits in the DACL corresponding to the JTAG TAP 207 so that no read or write access is permitted.

A fourth method of using the hypervisor is using HBI 215 and its MMU tracer 215a to monitor process transitions without cooperation from the host system. The monitor coprocessor 211 periodically reads any new entries from a buffer of MMU tracer 215a and uses them to update statistics about the total user-space CPU time consumed by each process. It also uses its introspection library to obtain additional information about the processes being monitored when possible, such as the commands used to invoke them.

A fifth method of using the hypervisor is using access libraries to perform tasks that are not directly security-related. Using kernel introspection in conjunction with direct AHB memory access permits code deployment to the host processor, which is useful when it is more convenient to deploy code through the monitor coprocessor 211 than using another interface, such as a network interface.

For this method, two additional programs were developed that run on the host processor. The first is a code deployment framework, and the second is a stub process that transfers data from the monitor coprocessor interface to the payload deployment framework. The code deployment framework uses a socket interface to receive executable code encapsulated in a Java JAR file, and the stub process uses that interface to send code to the framework. The stub process allocates an empty memory region at a well-known location in its virtual address space. The monitor coprocessor 211 sequentially loads data blocks directly into that memory region using the introspection library to obtain the physical address of that region. It uses a simple protocol based on word-length control codes to coordinate the transfer of data chunks.

The above-described hardware hypervisor design allows for tightly-coupled IDS solutions to be developed by exporting VMM-like functionality through well-designed hardware interfaces.

What is claimed is:

1. A hardware hypervisor for modifying a host processor system to provide security against malware, the host processor system having at least a central processing unit (CPU) with a memory management unit (MMU), a high-speed bus for providing data links between the CPU, other bus masters, and peripherals, wherein one of the bus masters is a debug interface unit, the hypervisor comprising:
   a monitor co-processor having its hardware processing elements different from, and configured to operate independently from, the host processor system;
   a communications interface for providing a hardwired communications link between the monitor co-processor and the debug interface unit;
   wherein the communications interface is a hardware modification of the debug interface unit;
   a behavioral interface on the high-speed bus, configured to monitor control signals from the CPU and transactions on system interconnects;
   wherein the behavioral interface has an MMU tracer configured to monitor changes in a context number stored in the MMU and a lapse of time between each change;
   an access controller on the high-speed bus, configured to store access control data, to intercept requests on the high-speed bus that are associated with operation of the host processor system, to evaluate the requests against the access control data, and to grant or deny the requests; and
   wherein the behavioral interface and the access controller are accessible to the monitor co-processor via the communications interface and are implemented as slave peripheral hardware devices on the high speed bus.

2. The hypervisor of claim 1, wherein the hypervisor is operable without changes to the software of the host processor system.

3. The hypervisor of claim 1, wherein the access control data is a device access control list (DACL) that stores a matrix of master versus slave peripherals with corresponding bits to indicate whether read or write access is to be blocked.

4. The hypervisor of claim 3, wherein one of the master peripherals is a JTAG TAP, and wherein the bits are set to prevent read or write access of the JTAG TAP.

5. The hypervisor of claim 1, wherein the access control data is address data representing a region of peripheral addresses whose transactions are to be restricted.

6. The hypervisor of claim 5, wherein the address data represents a write-protected region such that the system call table cannot be written by any bus transaction issued by the CPU.

7. The hypervisor of claim 1, wherein the co-processor is configured to periodically read a system call table via the debug interface unit, to generate a digest from the call table, and to report to an administrator if the digest changes.

8. An improved processor system, the host processor system having at least a central processing unit (CPU) with a memory management unit (MMU), a high-speed bus for providing data links between the CPU and peripherals, wherein one of the peripherals is a debug interface unit, the improvements comprising:
   a monitor co-processor having its hardware processing elements different from, and configured to operate independently from, the host processor system;
   a communications interface for providing a hardwired communications link between the monitor co-processor and the debug UART;
   wherein the communications interface is a hardware modification of the debug interface unit;
   a behavioral interface on the high-speed bus, configured to monitor control signals from the CPU and transactions on system interconnects;
   wherein the behavioral interface has an MMU tracer configured to monitor changes in a context number stored in the MMU and a lapse of time between each change;
   an access controller on the high-speed bus, configured to store access control data, to intercept requests on the high-speed bus that are associated with operation of the host processor system, to evaluate the requests against the access control data, and to grant or deny the requests; and
   wherein the behavioral interface and the access controller are accessible to the co-processor via the communications interface and are implemented as slave peripheral hardware devices on the high speed bus.

9. A method of modifying a host processor system to provide security against malware, the host processor system having at least a central processing unit (CPU) with a memory management unit (MMU), a high-speed bus for providing data links between the CPU, other bus masters, and peripherals, wherein one of the peripherals is a debug interface unit, the method comprising: providing a co-processor programmed to perform one or more security tasks;
   wherein the monitor co-processor has its hardware processing elements different from, and configured to operate independently from, the host processor system;
   modifying the debug interface unit to provide a communications interface between the co-processor and the debug interface unit;
   wherein the communications interface is a hardware modification of the debug interface unit;
   providing a communications link between the communications interface and the co-processor;
   providing a behavioral interface on the high-speed bus, configured to monitor control signals from the CPU and transactions on system interconnects;
   wherein the behavioral interface has an MMU tracer configured to monitor changes in a context number stored in the MMU and a lapse of time between each change;
   providing an access controller on the high-speed bus, configured to store access control data, to intercept requests on the high-speed bus that are associated with operation of the host processor system, to evaluate the requests against the access control data, and to grant or deny the requests; and wherein the behavioral interface and the access controller are accessible to the co-processor via the communications interface and are implemented as slave peripheral hardware devices on the high speed bus.

10. The method of claim 9, wherein the hypervisor is operable without changes to the software of the host processor system.

11. The method of claim 9, wherein the access control data is a device access control list (DACL) that stores a matrix of master versus slave peripherals with corresponding bits to indicate whether read or write access is to be blocked.

12. The method of claim 11, wherein one of the master peripherals is a JTAG TAP, and wherein the bits are set to prevent read or write access of the JTAG TAP.

13. The method of claim 9, wherein the access control data is address data representing a region of master and/or slave peripheral addresses whose transactions are to be restricted.

14. The method of claim 13, wherein the address data represents a write-protected region such that the system call table cannot be written by any bus transaction issued by the CPU.

15. The method of claim 9, wherein the co-processor is configured to periodically read a system call table via the debug interface unit, to generate a digest from the call table, and to report to an administrator if the digest changes.

* * * * *